US007477741B1

(12) United States Patent
Oakley

(10) Patent No.: US 7,477,741 B1
(45) Date of Patent: Jan. 13, 2009

(54) ANALYSIS RESISTANT CIPHER METHOD AND APPARATUS

(75) Inventor: Ernest C. Oakley, Pasadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 734 days.

(21) Appl. No.: 10/956,712

(22) Filed: Oct. 1, 2004

(51) Int. Cl.
*H04K 1/00* (2006.01)
*H04N 7/167* (2006.01)
*G06F 7/52* (2006.01)
*G06K 9/46* (2006.01)

(52) U.S. Cl. .................. 380/217; 380/28; 708/656; 382/233

(58) Field of Classification Search .......... 380/217, 380/28; 708/656; 382/233
See application file for complete search history.

(56) References Cited

U.S. PATENT DOCUMENTS

| 5,297,073 | A | * | 3/1994 | Davidian | 708/655 |
| 5,442,699 | A | | 8/1995 | Arnold et al. | 380/4 |
| 5,796,837 | A | | 8/1998 | Kim et al. | 380/28 |
| 5,828,754 | A | * | 10/1998 | Hogan | 341/69 |
| 5,991,415 | A | | 11/1999 | Shamir | 380/30 |
| 6,125,182 | A | * | 9/2000 | Satterfield | 380/28 |
| 6,269,163 | B1 | | 7/2001 | Rivest et al. | 380/28 |
| 6,304,658 | B1 | | 10/2001 | Kocher et al. | 380/30 |
| 6,330,332 | B1 | | 12/2001 | Itoh et al. | 380/28 |
| 6,504,929 | B1 | | 1/2003 | Tsunoo | 380/28 |
| 6,539,092 | B1 | | 3/2003 | Kocher | 380/252 |
| 6,696,993 | B2 | * | 2/2004 | Karczewicz | 341/67 |
| 7,095,896 | B2 | * | 8/2006 | Abe et al. | 382/233 |
| 2001/0002486 | A1 | | 5/2001 | Kocher et al. | 713/171 |
| 2003/0044003 | A1 | | 3/2003 | Chari et al. | 380/28 |

(Continued)

OTHER PUBLICATIONS

John Kelsey, Lecture Notes in Computer Science, Compression and Information Leakage of Plaintext, Publisher: Springer-Verlag Heidelberg, ISSN: 0302-9743, vol. 2365/2002, Chapter: p. 263-276; Online date: Aug. 2003.
Niels Ferguson et al., "Helix—Fast Encryption and Authentication in a Single Cryptographic Primitive," pp. 1-18, Oct. 1, 2004.

*Primary Examiner*—Christopher A Revak
*Assistant Examiner*—Bryan Wright
(74) *Attorney, Agent, or Firm*—Mark Homer

(57) ABSTRACT

A system for encoding and decoding data words including an anti-analysis encoder unit for receiving an original plaintext and producing a recoded data, a data compression unit for receiving the recoded data and producing a compressed recoded data, and an encryption unit for receiving the compressed recoded data and producing an encrypted data. The recoded data has an increased non-correlatable data redundancy compared with the original plaintext in order to mask the statistical distribution of characters in the plaintext data. The system of the present invention further includes a decryption unit for receiving the encrypted data and producing a decrypted data, a data decompression unit for receiving the decrypted data and producing an uncompressed recoded data, and an anti-analysis decoder unit for receiving the uncompressed recoded data and producing a recovered plaintext that corresponds with the original plaintext.

15 Claims, 7 Drawing Sheets

U.S. PATENT DOCUMENTS

| | | |
|---|---|---|
| 2003/0133567 A1 | 7/2003 | Yajima et al. .................. 380/30 |
| 2003/0142818 A1 | 7/2003 | Raghunathan et al. ......... 380/1 |
| 2003/0152230 A1 | 8/2003 | Eaker ......................... 380/255 |
| 2003/0212899 A1 | 11/2003 | Curtis ......................... 713/200 |
| 2004/0003275 A1 | 1/2004 | Nakada et al. .............. 713/193 |
| 2004/0208231 A1* | 10/2004 | Suzuki ........................ 375/130 |

* cited by examiner

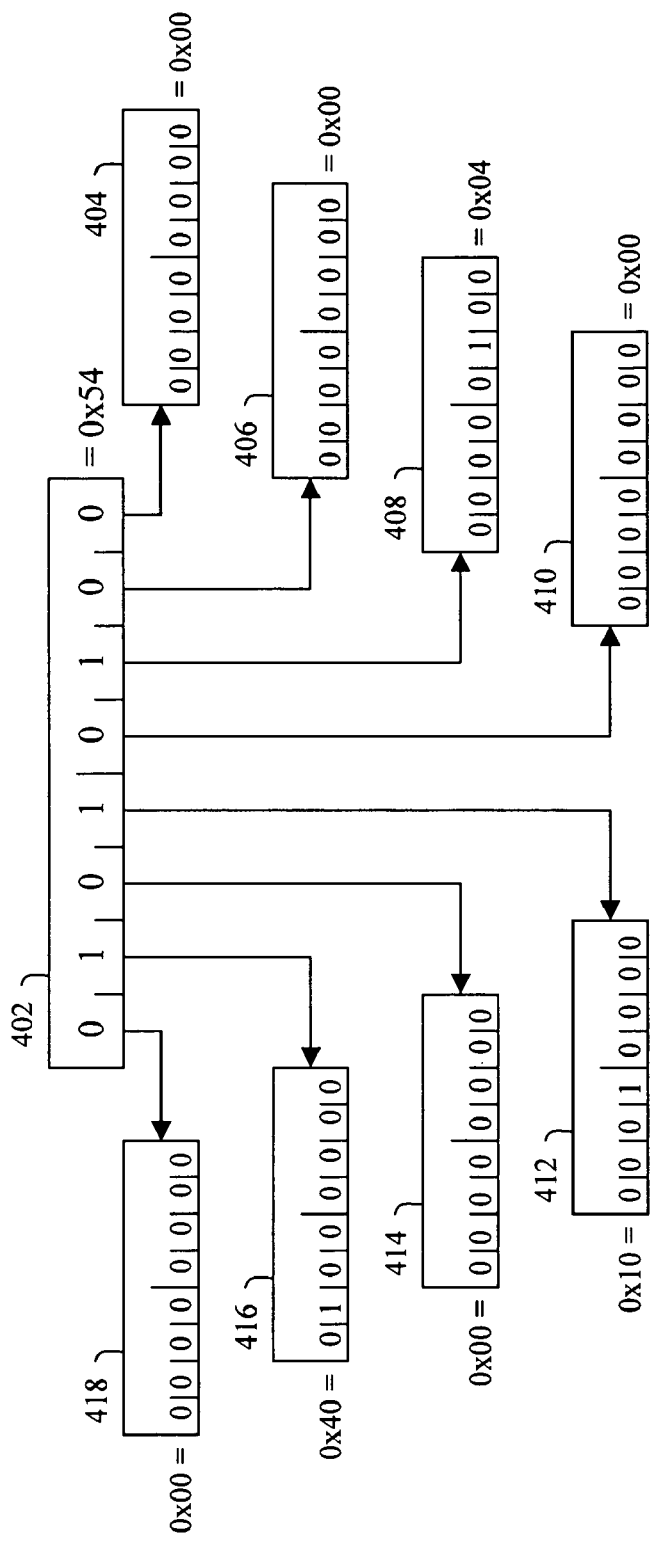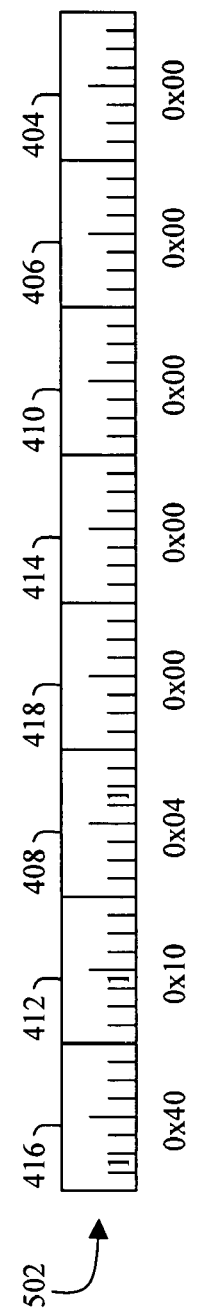
FIG. 4
FIG. 5

ANALYSIS RESISTANT CIPHER METHOD AND APPARATUS

FIELD OF THE INVENTION

The present invention relates to the recoding of data, and more particularly to a recoding of plaintext data prior to encryption in order to inhibit cryptanalysis.

DESCRIPTION OF RELATED ART

Although there are many excellent modern data encryption methods, they can suffer from a common fault, if they encode-in-place and create a ciphertext output file which is the same length as the plaintext input file. This sameness in length implies that the ciphertext may still be vulnerable to a Crypt-Analytic attack, where the statistical distribution of characters may be an aid to eventually breaking the encryption. Thus, there exists a need to mask the statistical distribution of characters in a plaintext in order to reduce vulnerability to Crypt-Analytic attack.

BRIEF SUMMARY OF THE INVENTION

The present invention teaches an enhancement to many modern encryption methods, by re-coding the original plaintext file from in a format conforming to either the American Standard Code for Information Interchange (ASCII) or the Extended Binary Coded Decimal Interchange Code (EBCDIC) text, for example, into a differently-coded file that has less information-density and hence more potential redundancy. Some types of re-coding are more effective at introducing non-correlatable data redundancy, which increases the file size. Some types of re-codings can permit sorting-and-ordering, to group the redundancy so that it can be minimized by an ancillary Data Compression Engine. This recovers some of the original compactness, without rendering the file impossible to reconstruct.

The re-coding advantage arises not from merely increasing file bulk, but in introducing non-correlatable data-redundancy to reduce the coding efficiency of the plaintext file which masks the statistical distribution of data characters and renders the corresponding ciphertext file less susceptible to Crypt-Analytic attack which can include statistical methods of attack, Linear cryptanalysis, and Differential cryptanalysis. The ancillary Encryption Engine is still needed to provide the complex cross-shuffling of the data, and to permit the acceptance and manipulation of one or more unique keys. Plaintext in this context means unencrypted data.

The present invention teaches two algorithms or schemes, called CIPHER08 and CIPHER32, alluding to their initial, but not final, increase in file-size. The final file-size is determined by how much non-correlatable data-redundancy can be removed by an ancillary Data-Compression Engine, before the intermediate file is sent to the ancillary Encryption Engine, for conversion into the resulting ciphertext file. Future research may show that the simpler CIPHER08 algorithm is sufficient to render the resulting ciphertext file sufficiently immune from Crypt-Analytic attack.

In that case, the need for the more complex CIPHER32 algorithm may be reduced. However, current practice shows that there may be a need for more than one level of data security, in the interests of conserving bandwidth and/or processing time. This is determined by how long in time that an encrypted file must continue to resist Crypt-Analytic attack. Alternatively, applying the two schemes sequentially might serve to better protect an especially sensitive message.

The CIPHER32 algorithm might be so effective so as to render the Courier-Pouch obsolete for messages requiring the highest secrecy. That is, messages could be so secure, that exposing them in a public communications channel would incur negligible risk of compromise. It is anticipated that even if unintended third-parties were to know and understand these enhancement algorithms, they would still not be able to remove their correlation masking-effect, without also knowing the encryption key.

CIPHER08 and CIPHER32 are not encryption methods, but are schemes for appending external non-invertibility to encryption engines which are invertible. That is, the engines operate bi-directionally with the same key. Some encryption engines do apply non-invertibility, but do so internally, which does not disguise the plaintext as do CIPHER08 and CIPHER32.

In one embodiment, the present invention teaches a system including an anti-analysis encoder unit for receiving an original plaintext and producing a recoded data, a data compression unit for receiving the recoded data and producing a compressed recoded data, and an encryption unit for receiving the compressed recoded data and producing an encrypted data. The recoded data has an increased non-correlatable data redundancy compared with the original plaintext. The system of the present invention further includes a decryption unit for receiving the encrypted data and producing a decrypted data, a data decompression unit for receiving the decrypted data and producing an uncompressed recoded data, and an anti-analysis decoder unit for receiving the uncompressed recoded data and producing a recovered plaintext that corresponds with the original plaintext.

In another embodiment, the present invention teaches a method for encoding including the steps of obtaining an original data word in a plaintext, generating a group of new data words consisting of a predetermined number of new data words equal to the number of data bits in the original data word, sorting the new data words in the group into either an ascending or descending order based on the binary value of the new data words in order to facilitate compression; and outputting the group of new data words.

Each original data word has a fixed number of data bits, ones or zeros, occupying known positions within the data word. Each new data word has the corresponding data bit from the original data word in the same position while the remaining bits of each new data word are zero. The total number of data bits in each original data word can be 8-bits, 16-bits, or 32-bits, for example. The sorting order of the sequentially generated groups of new data words can be alternating ascending and descending. The initial sorting order of the sequentially generated groups of new data words can be either ascending or descending.

In another embodiment, the present invention teaches a method for decoding including the steps of obtaining a group of data words where each word has at most one bit set to the value one in mutually exclusive positions and outputting a single data word consisting of all the value one bits in their mutually exclusive positions while the remaining bits are set to value zero. In this case, the group of data words can be sorted in either an ascending or a descending order.

In another embodiment, the present invention teaches a method of encoding including the steps of obtaining an original data word in an original plaintext, calculating the binary value of the original data word to determine a number of binary ones, distributing the number of binary ones randomly among a group of new data words, sorting the new data words in the group into either an ascending or a descending order based on the binary value the new data words in order to facilitate compression, and outputting the group of new data words. Alternatively, the sorting of new data words in the group can be randomly determined into either an ascending or a descending order. This random sorting of new words greatly enhances the obscuration of the plaintext and can somewhat reduce the possible compaction of the sorted data by a data compression engine.

Each original data word contains a fixed number of data bits occupying known positions within the data word, and each data bit is designated as either a one or a zero. The number of new data words in the group is determined from the maximum possible number of data ones plus one and divided by the number of data bits in each data word. Alternatively, the maximum possible number of data ones plus one is the maximum numerical value plus one. Although the preferred number of data bits in each data word is 8-bits, the total number of data bits in each original data word can also be 16-bits or 32-bits. If the number of data bits in the original data word is 8, then the number of new data words in the group is 32 since $2^8-1$ is the maximum numerical value and $2^8$ is the maximum numerical value plus one. Dividing this maximum numerical value plus one by the word size yields the number of new data words. Expressed mathematically, $(2^8)/8=256/8=32$.

Similarly, if the number of data bits in the original data word is 16, then the number of new data words in the group is 4,096 since $2^{16}=65,536=4,096*16$. Although larger word sizes are possible with this algorithm, they may not be practical due to processing and memory constraints in a typical processor. The sorting order of the sequentially generated groups of new data words can be alternating ascending and descending. The initial sorting order of the sequentially generated groups of new data words can be either ascending or descending. Alternatively, the initial sorting order can be randomly chosen to be either ascending or descending.

In another embodiment, the present invention teaches a method for decoding including the steps of obtaining a group containing data words, summing the number of ones in each of the plurality of data words in the group to produce a one sum value, and outputting a single data word having the one sum value represented as a binary value. Each of the words in the group can be sorted in either an ascending or descending order.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 4 shows a specific mapping of bits in a sample original data word to a group of generated data words according to an embodiment of the invention.

FIG. 5 shows a specific mapping of bits in a sample original data word to a group of generated data words where the generated data words are sorted and concatenated together according to an embodiment of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the intention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
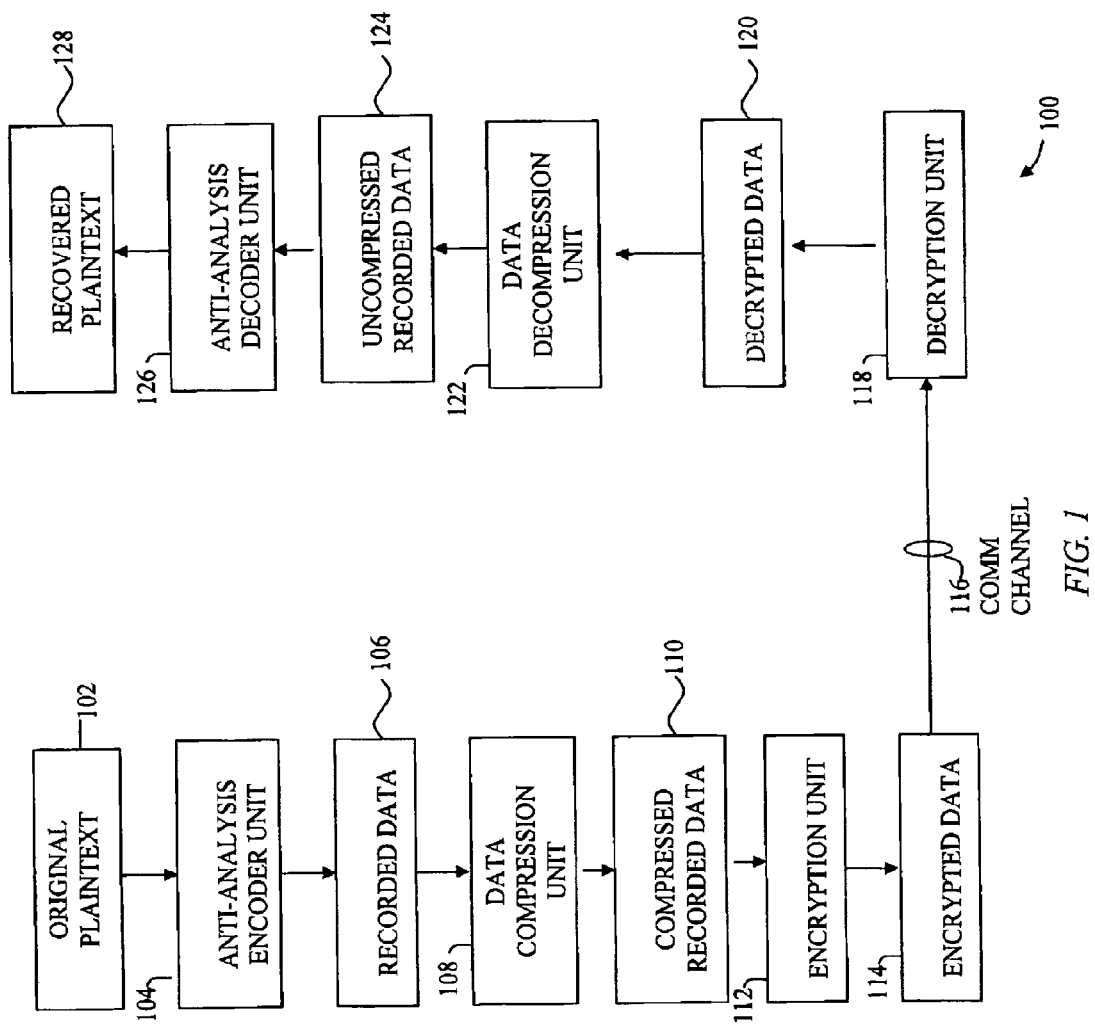
FIG. 1 is a block diagram showing recoding, compression, encryption, transmission, decryption, decompression and un-recoding according to an embodiment of the invention.

In reference to FIG. 1, a recoded encryption and decryption system 100 for increasing non-correlatable data redundancy to inhibit analysis and includes an anti-analysis encoder unit 104, a data compression unit 108, an encryption unit 112, a decryption unit 118, a data decompression unit 122, and an anti-analysis decoder unit 126. Re-coding introduces a non-correlatable data-redundancy to reduce the coding efficiency of the plaintext file which masks the statistical distribution of the data characters and renders the corresponding ciphertext file less susceptible to Crypt-Analytic attack which can include statistical methods of attack, Linear cryptanalysis, and Differential cryptanalysis.

The anti-analysis encoder unit 104 receives an original plaintext 102 and produces a recoded data 106. The recoded data 106 has an increased non-correlatable data redundancy as compared with the original plaintext 102. The data compression unit 108 receives the recoded data 106 and produces a compressed recoded data 110. The encryption unit 112 receives the compressed recoded data 110 and produces an encrypted data 114. The encrypted data 114 is transmitted through a communication channel 116 to the decryption unit 118. The communication channel 116 can be a wireless communication path, a wire-based communication path, an optical communication path, transferring files via transportable media, or may include printed text, for example.

The decryption unit 118 receives the encrypted data 114 and produces a decrypted data 120. The text decompression unit 122 receives the decrypted data 120 and produces an uncompressed recoded data 124. The anti-analysis decoder unit 126 receives the uncompressed recoded data 124 and produces a recovered plaintext 128 that corresponds with the original plaintext 102.

Figure 2:
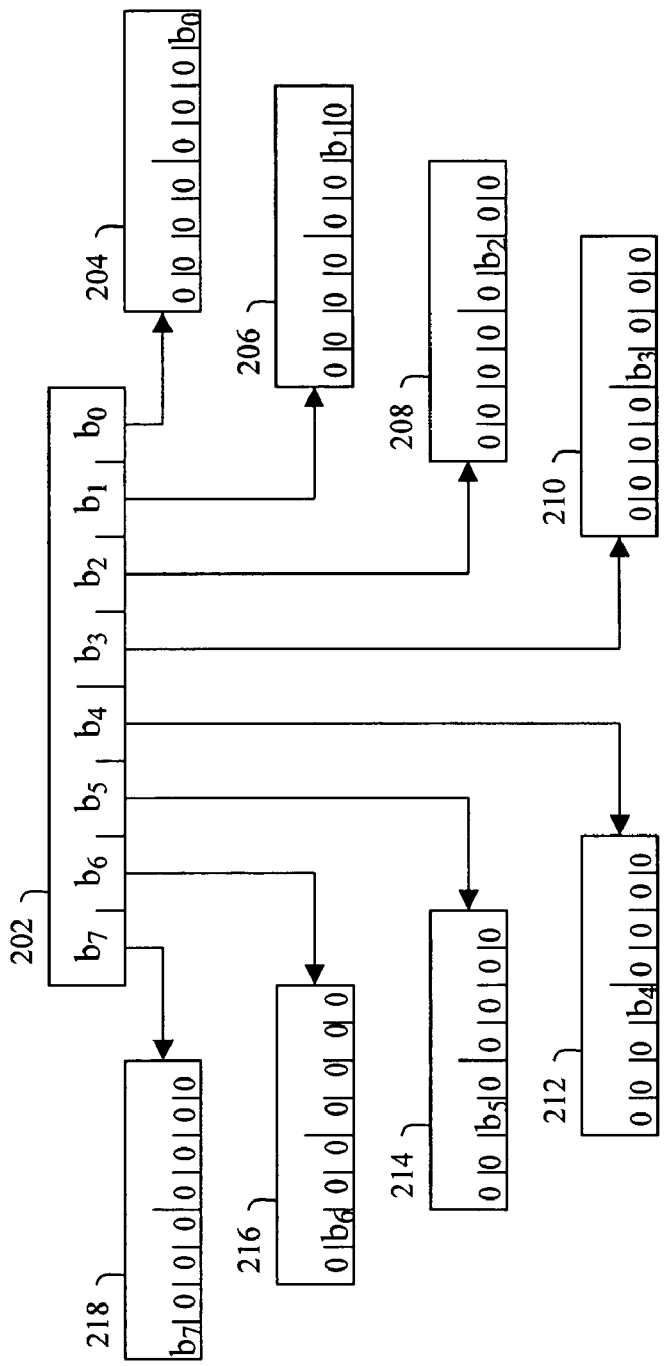
FIG. 2 shows a generic mapping of bits in a sample original data word to a group of generated data words according to an embodiment of the invention.

CIPHER08 (NCIPH08 and DCIPH08): In one embodiment, the recoded encryption and decryption system 100 for increasing non-correlatable data redundancy uses a scheme called CIPHER08 which includes an encoding scheme called NCIPH08 and a decoding scheme called DCIPH08. In reference to FIG. 2, the NCIPH08 scheme introduces data-redundancy by splitting each data word of original plaintext 202 into a number of single-bit bit-plane words (204 to 218) based on the number of bits in the word of original plaintext 202.

Figure 3:
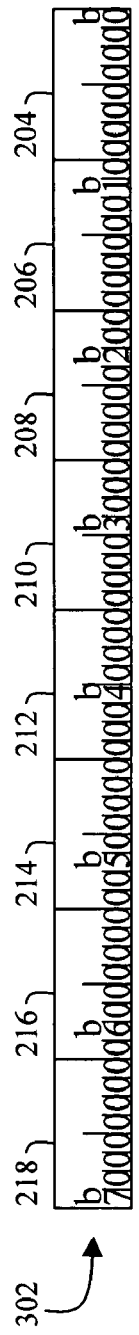
FIG. 3 shows a generic mapping of bits in a sample original data word to a group of generated data words where the generated data words are concatenated together according to an embodiment of the invention.

For example, an original data word 202 having eight bits is obtained from the original plaintext 102. The eight bits of the original data word 202 occupy particular positions within the original data word shown as b0 to b7. A group of eight new words (204 to 218) is generated. Each of these generated new words (204 to 218) contains only one bit in a position that corresponds to the position of the bit within the original data word 202, while the rest of the bits in the generated word are zeros. FIG. 3 shows the generated words (204 to 218) as they are concatenated to form a group 302 that is then output as a part of the recoded data 106. The CIPHER08 algorithm may be implemented on a suitably programmed microcomputer.

FIG. 4 shows a specific mapping of bits in a sample original data word 402 having a value of 0x54 to a group of eight generated data words (404 to 418). The bit in the b0 position of the original data word 402 is mapped to the b0 position of the generated data word 404. The bit in the b1 position of the original data word 402 is mapped to the b1 position of the generated data word 406. Similarly, the remaining bits of the original data word 402 are each mapped to the corresponding position within a newly generated data word yielding a one-to-one correspondence between each of the bits of the original data word and a correspondingly located bit having the same value in each of the generated words (404 to 418).

FIG. 5 shows a specific mapping of bits in a sample original data word to a group of generated data words (404 to 418) where the generated data words are sorted and concatenated together to form a sorted group 502 according to an embodiment of the invention. The mutually exclusive mapping of the bits of the original data word 402 onto the generated words (404 to 418) permits the data to be extracted after sorting.

Figure 6:
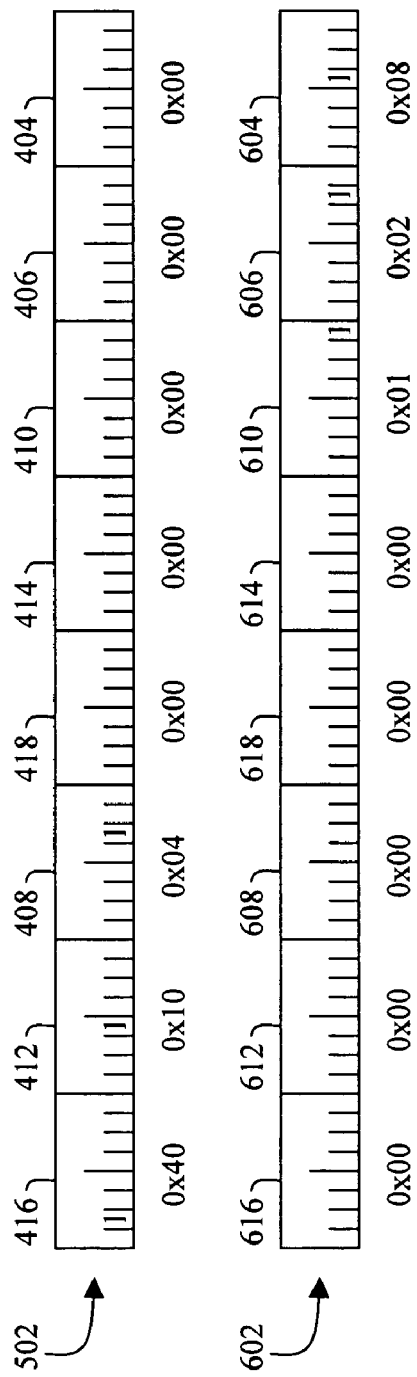
FIG. 6 shows a group of newly generated words with a first mapping of bits from a first original data word that is sorted in ascending order followed by a second group of newly generated words with a second mapping of bits from a second original data word that is sorted in descending order.

FIG. 6 shows the group 502 of newly generated words with a first mapping of bits from a first original data word that is sorted in ascending order followed by a second group 602 of newly generated words with a second mapping of bits from a second original data word that is sorted in descending order. The newly generated word 616 follows the newly generated word 404 and illustrates an alternating ascending and descending order sort.

Figure 7:
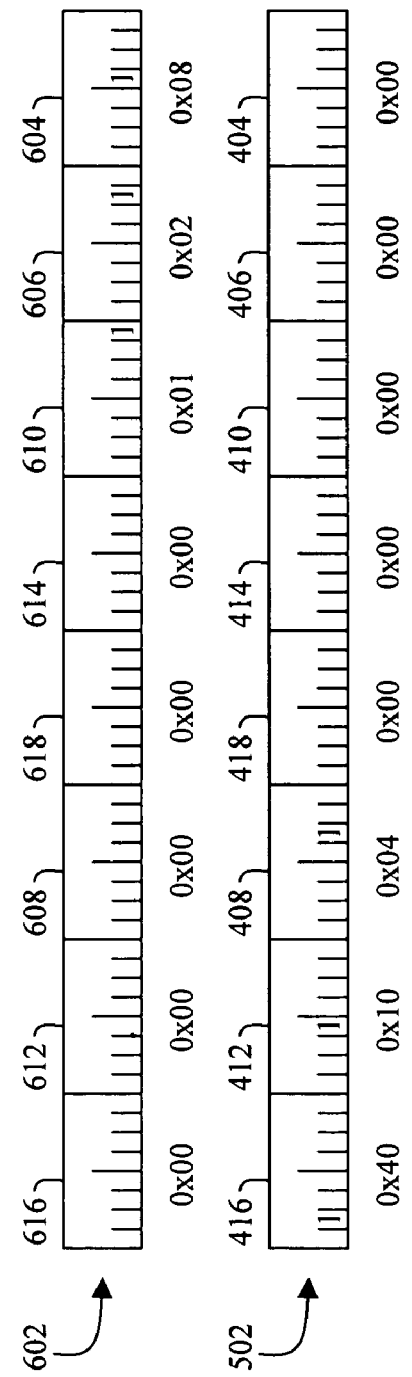
FIG. 7 shows a group of newly generated words with a first mapping of bits from a first original data word that is sorted in descending order followed by a second group of newly generated words with a second mapping of bits from a second original data word that is sorted in ascending order.

FIG. 7 shows a group of newly generated words with a first mapping of bits from a first original data word that is sorted in ascending order followed by a second group of newly generated words with a second mapping of bits from a second original data word that is sorted in descending order. The newly generated word 416 follows the newly generated word 604 and illustrates an alternating descending and ascending order sort.

As with the description of FIG. 6, the determination of ascending and descending may be a matter of perspective where the order the words are transmitted or stored can determine whether subsequent word groups are sorted in an ascending or descending manner. Hence, these notations are relative. An aspect of using the alternating ascending or descending sort is that the zero value words will be grouped together and permit a more efficient compression result from the data compression unit 108. The choice for the sorting order of the very first group of new data words, whether ascending or descending, may be made randomly or by a default choice of either order. As an alternative, the choice of either an ascending or descending sorting order between subsequent word groups can also be made randomly. This can contribute to the data obscuration of the original plaintext while potentially sacrificing some measure of data compression since the zero value words may not always be grouped together as with an alternating ascending and descending sort order between subsequent words.

Clearly, there are four choices regarding sorting of the new data words between subsequent word groups: ascending only, descending only, alternately ascending and descending, and randomly either ascending or descending. Each of these single-bit bit-plane words can contain only one unique value based on a binary assignment of value depending on the particular bit position. For example, each bit represents a binary digit that can be only one of two values, zero or one. If each word of original plaintext has 8 data bits, the individual values for each data bit range from one (1) if the b0 bit is set to the value one, to one-hundred twenty-eight (128) if the b7 bit is set to the value one, while each of the generated words will be all zeros if the corresponding bit is set to the value zero.

Therefore, each original data word is expanded into eight one-byte bit-planes, organized into 8-byte blocks if the word size of the original plaintext word is 8 bits. Similarly, other word sizes may be used including 4-bit, 16-bit, 32-bit, and 64-bit words. Furthermore, the 8-byte blocks are internally sorted in alternate ascending and descending order [represented as /, \, /, \, . . . ], to further maximize the grouping of zero-valued bytes together, even in subsequent blocks. The ancillary data-compression of the blocked file will produce an intermediate file in which the 8-byte block boundaries are blurred, thus rendering the blocking-structure indistinct.

The compressed intermediate file has a reduced statistical correlation with the original plaintext file, and the ancillary Encryption Engine will yield a ciphertext file possessing a blocking structure impossible to reconstruct, without the encryption key. A file which has been encoded using the NCIPH08 scheme, and subsequently compressed, can have only one of two possible variable lengths, depending on the initial sort-order [/, \, . . . ] of the encoded file if the alternating ascending and descending sort order is used. However, the NCIPH08 scheme benefits from the use of random sort ordering between subsequent words since more than two possible variable lengths are then possible.

Below is an example QBASIC Program code to implement the NCIPH08 scheme:

```
' +=========================================================================+
' |   N C I P H 0 8 -- eNcode module of CIPHER08.                           |
' |   Ernest C. Oakley          QBASIC Program       2002_06_20             |
' |   % = I_S              & = I_L        ! = F_S       # = F_L             |
' +=========================================================================+
I$ = "c:\HEX256.bin"                                            ' Test file.
OPEN I$ FOR BINARY ACCESS READ AS #1                            ' Test file.
' --------------------------------------------  '---------------------------
HMS$ = MID$(TIME$, 1, 2) + MID$(TIME$, 4, 2) + MID$(TIME$,7, 2)
O$ ="c:\NC" + HMS$ + ".bin"                     ' Bit-plane output.
'   O$ = "c:\NCIPH08.bin"                                       ' Bit-plane.
OPEN O$ FOR BINARY ACCESS WRITE AS #2                           ' Bit-plane.
' --------------------------------------------  '---------------------------
RANDOMIZE TIMER                                 ' Epoch past midnight.
SRT% = INT(RND * 2)                             ' Initial sort ASC'ng or DES'ng?
' --------------------------------------------  '---------------------------
P& = 1                                          ' Initialize output file-pointer.
'                                               '
DO WHILE (NOT EOF(1))                           '
A$ = INPUT$(1, #1)                              ' Get unconverted Characters.
IF A$ = " " THEN EXIT DO                        ' Null-string?
B% = ASC(A$)                                    ' Input byte numeric equivalent.
FOR E% =0 TO 7                                  ' Exponent-of-two.
    T$ = T$ + CHR$((B% MOD 2) * 2 &thsp; E%)  ' Low-order bit set?
    B% = B% \ 2                                 ' Discard a lo-order bit.
NEXT E%                                         ' Next Exponent-of-two.
' --------------------------------------------  '---------------------------
' BUBBLE-SORT with Flag (switch) is, for THIS purpose, faster than
' SHELL or other sorts which require more computational overhead for
'    small records.                             '---------------------------
CONST FALSE% = 0, TRUE% = NOT FALSE
DO                                              ' Bubble-sort with flag.
FLAG% = FALSE%                                  ' No exchanges have occured.
FOR K% = 1 TO 7                                 ' Byte-wise in Block.
SELECT CASE SRT%                                ' Depending on Sort-Order:
    CASE 0                                      ' Ascending?
        P$ = MID$(T$, K%, 1)                    '
        Q$ = MID$(T$, K% +1, 1)                 '
        IF P$ > Q$ THEN                         ' Not ascending?
            MID$(T$, K%, 1) = Q$                  ' Exchange.
            MID$(T$, K% + 1, 1) = P$              ' Exchange.
            FLAG% = TRUE%                       ' Exchange has occured.
        END IF                                  '---------------------------
    CASE 1                                      ' DEscending?
        P$ = MID$(T$, K%, 1)                    '
        Q$ = MID$(T$, K% +1, 1)                 '
        IF P$ < Q$ THEN                         ' Not ascending?
            MID$(T$, K%, 1) = Q$                  ' Exchange.
            MID$(T$, K% + 1, 1) = P$              ' Exchange.
            FLAG% = TRUE%                       ' Exchange has occured.
        END IF                                  '
END SELECT                                      ' Depending on Sort-Order:
NEXT K%                                         '---------------------------
LOOP WHILE FLAG%                                ' Continue 'til no more exchanges.
SRT% = SRT% XOR 1                               ' Reverse sort-order, next pass.
' --------------------------------------------  '---------------------------
PUT #2, P&, T$                                  ' Output one 8-byte field/file.
I& = I& + 1                                     ' IN-bytes accumulate count.
O& = O& + 8                                     ' OUT-bytes accumulate count.
P& = P& + 8                                     ' Increment output file-pointer.
T$ = " "                                        ' Null-out Tally output string.
LOOP                                            ' 'Til end-of-file.
'                                               ' Come here at End-of-File.
' --------------------------------------------  '---------------------------
PRINT "File-length_1 ="; LOF(1), "Bytes-in ="; I&
PRINT "Calculated Bytes-out ="; 8 * I&
PRINT "File-length_2 ="; LOF(2), "Bytes-out ="; O&
PRINT "Skipped? = "; (LOF(1) – I&)
CLOSE #1, #2                                    '
' =========================================================================
SYSTEM                                          '
```

Below is an example QBASIC Program code to implement the decode module of CIPHER08:

```
' +================================================================+
' |    D C I P H 0 8 -- Decode module of CIPHER08.                 |
' |    Ernest C. Oakley         QBASIC Program    2002_06_20       |
' |    % = I_S              & = I_L      ! = F_S     # = F_L       |
' +================================================================+
I$= "c:\NCIPH08.bin"                                  ' Bit-planes.
OPEN I$ FOR BINARY ACCESS READ AS #1                  ' Bit-planes.
' ---------------------------------------------    '----------------
O$ = "c:\DCIPH08.bin"                                 ' Plaintext.
OPEN O$ FOR BINARY ACCESS WRITE AS #2                 ' Plaintext.
' ---------------------------------------------    '----------------
CLS
PO& = 1                                           ' Initialize output file pointer.
                                                  '----------------
DO WHILE (NOT EOF(1 ))
T$ = INPUT$(8, #1)                                ' Get length=8 records.
C% = 0                                            ' Clear output character accum.
FOR PT% = 1 TO 8                                  ' Accumulate eight bit-planes.
    S$ = MID$(T$, PT%, 1)                         ' Isolate single byte-slice.
    IF S$ = " " THEN EXIT FOR                     ' Null-string?
    A% = ASC(S$)                                  ' Bit-plane partial sum.
    C% = C% OR A%                                 ' Boolean-sum bit-planes.
NEXT PT%                                          ' Next byte-slice.
Z$ = CHR$(C%)                                     ' Convert one 1-byte Character.
I& = I& + 8                                       ' Increment input counter.
PUT #2, PO&, Z$                                   ' Output one 1-byte Character.
PO& = PO& + 1                                     ' Increment output pointer.
O& = O& + 1                                       ' Increment output counter.
LOOP                                              ' 'Til end-of-file.
' ---------------------------------------------    '----------------
                                                  ' Come here for End-of-File.
PRINT "Filelength_1 ="; LOF(1), "Bytes-in ="; I&
PRINT "File-length_2 ="; LOF(2), "Bytes-out ="; O&
CLOSE #1, #2
' ================================================================+
SYSTEM
```

CIPHER32 (NCIPH32 and DCIPH32): In one embodiment, the recoded encryption and decryption system 100 for increasing non-correlatable data redundancy uses a scheme called CIPHER32 which includes an encoding scheme called NCIPH32 and a decoding scheme called DCIPH32. This algorithm introduces data-redundancy by converting the decimal equivalent of an 8-bit plaintext character into a series of from one (1) to two-hundred fifty-five (255) bits, randomly distributed throughout a 32-byte block. That is, CIPHER32 converts the source ASCII plaintext file into Tally Language.

One definition of Tally Language is symbolized by counting items in groups of five; four vertical marks grouped by a fifth horizontal slash which organizes the set. A mark (or slash) is the only character in that number system, and this one character does not possess positional-value. In CIPHER32's implementation of Tally Language, only the total number of set-bits in the 32-byte block is significant; neither the zero-bit positions nor the resultant pattern of the bits in each of the 32-bytes in the block, are significant. The CIPHER32 algorithm may be implemented on a suitably programmed microcomputer.

At this point in the algorithm, the complete randomness of the values of the bytes in the 32-byte block is a strength that may be sufficient. However, these blocks are likely to have little inherent redundancy, and yield only a small degree of compression efficiency. If the 32-bytes in a block are sorted, the redundancy will be improved, without compromising the coding. Furthermore, the 32-byte blocks can be internally sorted in alternate ascending and descending order [/, \, /, \, . . . ], to further maximize the grouping of same-valued bytes together, even in subsequent blocks. Despite this sorting within a block, the total number of set bits within the block is not changed, so the bit-count total for the block remains the same, and still accurately represents the equivalent decimal value of the original source byte.

The sorting-and-ordering and subsequent data-compression will produce an intermediate file in which the 32-byte block boundaries are completely blurred, thus rendering the blocking-structure indistinct. The compressed intermediate file no longer has any correlation with the original plaintext file, and the ancillary Encryption Engine will yield a ciphertext file possessing a blocking structure impossible to reconstruct, without the encryption-key.

A file which has been CIPHER32 (NCIPH32) encoded, and subsequently compressed, can have many possible variable lengths, depending on the initial sort-order of the encoded file, and the random decimal-equivalent values of the bytes which were selected to create the required total bit-count for the 32-byte blocks.

Below is an example QBASIC Program code to implement the encode module of CIPHER32:

```
' +=========================================================================+
' |    N C I P H 3 2    --    eNcode module of CIPHER32.                    |
' |    Ernest C. Oakley          QBASIC Program              2002_06_20     |
' |    % = I_S           & = I_L              ! = F_S        # = F_L        |
' +=========================================================================+
I$ = "c:\HEX256.bin"                                 ' Test file.
OPEN I$ FOR BINARY ACCESS READ AS #1                 ' Test file.
' ----------------------------------------------------------------------
HMS$ = MID$(TIME$, 1, 2) + MID$(TIME$, 4, 2) + MID$(TIME$,7, 2)
O$ = "c:\NC" + HMS$ + ".bin"                         ' Tally-language output.
'O$ = "c:\NCIPH32.bin"                               ' Tally-languange output.
OPEN O$ FOR BINARY ACCESS WRITE AS #2                ' Tally-language output.
' ----------------------------------------------------------------------
' What follows immediately are code-substitution strings, which are
' randomly searched to provide randomly selected substitution codes
' which contain the bit-count to match one of 32 sub-tallies.
' The strings are preferable to integer arrays which must be loaded
' with separate READs from DATA statements. Half the size, too.
'                              '----------------------------------------
B1$ = CHR$(1) + CHR$(2) + CHR$(4) + CHR$(8) + CHR$(16) + CHR$(32)
B1$ = B1$ + CHR$(64) + CHR$(128)    '
'                              '----------------------------------------
B2$ = CHR$(3) + CHR$(5) + CHR$(6) + CHR$(9) + CHR$(10) + CHR$(12)
B2$ = B2$ + CHR$(17) + CHR$(18) + CHR$(20) + CHR$(24) + CHR$(33)
B2$ = B2$ + CHR$(34) + CHR$(36) + CHR$(40) + CHR$(48) + CHR$(65)
B2$ = B2$ + CHR$(66) + CHR$(68) + CHR$(72) + CHR$(80) + CHR$(96)
B2$ = B2$ + CHR$(129) + CHR$(130) + CHR$(132) + CHR$(136) + CHR$(144)
B2$ = B2$ + CHR$(160) + CHR$(192)
'                              '----------------------------------------
B3$ = CHR$(7) + CHR$(11) + CHR$(13) + CHR$(14) + CHR$(19) + CHR$(21)
B3$ = B3$ + CHR$(22) + CHR$(25) + CHR$(26) + CHR$(28) + CHR$(35)
B3$ = B3$ + CHR$(37) + CHR$(38) + CHR$(41) + CHR$(42) + CHR$ (44)
B3$ = B3$ + CHR$(49) + CHR$(50) + CHR$(52) + CHR$(56) + CHR$(67)
B3$ = B3$ + CHR$(69) + CHR$(70) + CHR$(73) + CHR$(74) + CHR$(76)
B3$ = B3$ + CHR$(81) + CHR$(82) + CHR$(84) + CHR$(88) + CHR$(97)
B3$ = B3$ + CHR$(98) + CHR$(100) + CHR$(104) + CHR$(112) + CHR$(131)
B3$ = B3$ + CHR$(133) + CHR$(134) + CHR$(138) + CHR$(140) + CHR$(145)
B3$ = B3$ + CHR$(148) + CHR$(152) + CHR$(161) + CHR$(162) + CHR$(164)
B3$ = B3$ + CHR$(168) + CHR$(176) + CHR$(193) + CHR$(194) + CHR$(196)
B3$ = B3$ + CHR$(200) + CHR$(208) + CHR$ (224)
'                              '----------------------------------------
B4$ = CHR$(15) + CHR$(23) + CHR$(27) + CHR$(29) + CHR$(30) + CHR$(39)
B4$ = B4$ + CHR$(43) + CHR$(45) + CHR$(46) + CHR$(51) + CHR$(53)
B4$ = B4$ + CHR$(54) + CHR$(57) + CHR$(58) + CHR$(60) + CHR$(71)
B4$ = B4$ + CHR$(75) + CHR$(77) + CHR$(78) + CHR$(83) + CHR$(85)
B4$ = B4$ + CHR$(86) + CHR$(89) + CHR$(90) + CHR$(92) + CHR$(99)
B4$ = B4$ + CHR$(101) + CHR$(102) + CHR$(105) + CHR$(106) + CHR$(108)
B4$ = B4$ + CHR$(113) + CHR$(114) + CHR$(116) + CHR$(120) + CHR$(135)
B4$ = B4$ + CHR$(139) + CHR$(141) + CHR$(142) + CHR$(147) + CHR$(149)
B4$ = B4$ + CHR$(150) + CHR$(153) + CHR$(154) + CHR$(156) + CHR$(163)
B4$ = B4$ + CHR$(165) + CHR$(166) + CHR$(169) + CHR$(170) + CHR$(172)
B4$ = B4$ + CHR$(177) + CHR$(178) + CHR$(180) + CHR$(184) + CHR$(195)
B4$ = B4$ + CHR$(197) + CHR$(198) + CHR$(201) + CHR$(202) + CHR$(204)
B4$ = B4$ + CHR$(209) + CHR$(210) + CHR$(212) + CHR$(216) + CHR$(225)
B4$ = B4$ + CHR$(226) + CHR$(228) + CHR$(232) + CHR$(240)
'                              '----------------------------------------
B5$ =CHR$(31) + CHR$(47) + CHR$(55) + CHR(59) + CHR$(61) + CHR$(62)
B5$ = B5$ + CHR$(79) + CHR$(87) + CHR$(91) + CHR$(93) + CHR$(94)
B5$ = B5$ + CHR$(103) + CHR$(107) + CHR$(109) + CHR$(110) + CHR(115)
B5$ = B5$ + CHR$(117) + CHR$(118) + CHR$(121) + CHR$(122) + CHR$(124)
B5$ = B5$ + CHR$(143) + CHR$(151) + CHR$(155) + CHR$(157) +CHR$(158)
B5$ = B5$ + CHR$(167) + CHR$(171) + CHR$(173) + CHR$(174) + CHR$(179)
B5$ = B5$ + CHR$(181) + CHR$(182) + CHR$(185) + CHR$(186) + CHR$(188)
B5$ = B5$ + CHR$(199) + CHR$(203) + CHR$(205) + CHR$(206) + CHR$(211)
B5$ = B5$ + CHR$(213) + CHR$(214) + CHR$(217) + CHR$(218) + CHR$(220)
B5$ = B5$ + CHR$(227) + CHR$(229) + CHR$(230) + CHR$(233) + CHR$(234)
B5$ = B5$ + CHR$(236) + CHR$(241) + CHR$(242) + CHR$(244) + CHR$(248)
'                              '----------------------------------------
B6$ = CHR$(63) + CHR$(95) + CHR$(111) + CHR$(119) + CHR$(123)
B6$ = B6$ + CHR$(125) + CHR$(126) + CHR$(159) + CHR$(175) + CHR$(183)
B6$ = B6$ + CHR$(187) + CHR$(189) + CHR$(190) + CHR$(207) + CHR$(215)
B6$ = B6$ + CHR$(219) + CHR$(221) + CHR$(222) + CHR$(231) + CHR$(235)
B6$ = B6$ + CHR$(237) + CHR$(238) + CHR$(243) + CHR$(245) + CHR$(246)
B6$ = B6$ + CHR$(249) + CHR$(250) + CHR$(252)
'                              '----------------------------------------
B7$ = CHR$(127) + CHR$(191) + CHR$(223) + CHR$(239) + CHR$(247)
B7$ = B7$ + CHR$(251) + CHR$(253) + CHR$(254)
'                              '----------------------------------------
```

-continued

```
SCREEN 12                              ' 016   30×80   640×480
RANDOMIZE TIMER                        ' Epoch past midnight.
P& = 1                                 ' Initialize output file-pointer.
'                                      '----------------------------------------------------------
DO WHILE (NOT EOF(1))                  '
    A$ = INPUT$(1, #1)                 ' Get unconverted Character.
    IF A$ = " " THEN EXIT DO           ' Null-string?
    SRT% = INT(RND * 2)                ' Initial sort ASC'ng or DES'ng?
    B% = ASC (A$)                      ' Decimal equivalent.
    FOR   C% = 32 TO 1 STEP -1         ' Sub-tallies divisor & index.
        D% = B% \ C%                   ' Calculate integer sub-tally.
        B% = B% - D%                   ' Calculate new remainder.
        IF D% = 8 THEN D% = (&HFF)     ' Eight bits, only one way.
        IF D% = 7 THEN D% = ASC(MID$(B7$, RND * (LEN(B7$) - 1) + 1, 1))
        IF D% = 6 THEN D% = ASC(MID$(B6$, RND * (LEN(B6$) - 1) + 1, 1))
        IF D% = 5 THEN D% = ASC(MID$(B5$, RND * (LEN(B5$) - 1) + 1, 1))
        IF D% = 4 THEN D% = ASC(MID$(B4$, RND * (LEN(B4$) - 1) + 1, 1))
        IF D% = 3 THEN D% = ASC(MID$(B3$, RND * (LEN(B3$) - 1) + 11 1))
        IF D% = 2 THEN D% = ASC(MID$(B2$, RND * (LEN(B2$) - 1) + 11 1))
        IF D% = 1 THEN D% = ASC(MID$(B1$, RND * (LEN(B1$) - 1) + 1, 1))
        T$ = T$ + CHR$(D%)             ' Concatenate block-string.
    NEXT C%                            ' Next Block byte-count.
'   ----------------------------------'----------------------------------------------------------
'   BUBBLE-SORT with Flag (switch) is, for THIS purpose, faster than
'   SHELL or other sorts which require more computational overhead for
'   small records.                     '----------------------------------------
    CONST FALSE% = 0, TRUE% = NOT FALSE
    DO                                 ' Bubble-sort with flag.
    FLAG% = FALSE%                     ' No exchanges have occured.
    FOR K% = 1 TO 31                   ' Byte-wise in Block.
    SELECT CASE SRT%                   ' Depending on Sort-Order:
        CASE 0                         ' AScending?
            P$ = MID$(T$, K%, 1)       '
            Q$ = MID$(T$, K% + 1, 1)   '
            IF P$ > Q$ THEN            ' Not ascending?
                MID$(T$, K%, 1) = Q$   ' Exchange.
                MID$(T$, K% + 1, 1) = P$ ' Exchange.
                FLAG% = TRUE%          ' Exchange has occured.
            END IF                     '----------------------------------------
        CASE 1                         ' DEscending?
            P$ = MID$(T$, K%, 1)       '
            Q$ = MID$(T$, K% + 1, 1)   '
            IF P$ < Q$ THEN            ' Not descending?
                MID$(T$, K%, 1) = Q$   ' Exchange.
                MID$(T$, K% + 1, 1) = P$ ' Exchange.
                FLAG% = TRUE%          ' Exchange has occured.
            END IF                     '----------------------------------------
    END SELECT                         ' Depending on Sort-Order:
    NEXT K%                            '----------------------------------------
    LOOP WHILE FLAG%                   ' Continue 'til no more exchanges.
    SRT% = SRT% XOR 1                  ' Reverse sort-order, next pass.
'   ----------------------------------'----------------------------------------------------------
    PUT #2, P&, T$                     ' Output one 32-byte field/file.
    T$ = " "                           ' Initial Block null-string.
    I& = I& + 1                        ' IN-bytes accumulate count.
    O& = O& + 32                       ' OUT-bytes accumulate count.
    P& = P& + 32                       ' Increment output file-pointer.
    SRT% = SRT% XOR 1                  ' Reverse sort order next pass.
'                                      '----------------------------------------------------------
LOOP                                   ' 'Til end-of-file.
'                                      '----------------------------------------------------------
'                                      ' Come here at End-of-file.
'   ----------------------------------'----------------------------------------------------------
PRINT "Skipped? = "; (LOF(1) - I&)
PRINT "File-length_1 ="; LOF(1), "Bytes-in ="; I&
PRINT "Calculated Bytes-out ="; 32 * I&
PRINT "File-length_2 ="; LOF(2), "Bytes-out ="; O&
CLOSE #1, #2
'  +=================================================================+
SYSTEM                                 '
```

Below is an example QBASIC Program code to implement the decode module of CIPHER32:

```
' +======================================================================+
' |   D C I P H 3 2 -- Decode module of CIPHER32.                         |
' |   Ernest C. Oakley            QBASIC Program      2002_06_20          |
' |   % = I_S              & = I_L        ! = F_S       # = F_L           |
' +======================================================================+
I$ = "c:\NCIPH32.bin"                                       ' Tally-lang.
OPEN I$ FOR BINARY ACCESS READ AS #1                        ' Tally-lang.
' ------------------------------------------------  '------------------------
O$ = "c:\DCIPH32.bin"                                       ' Plaintext.
OPEN O$ FOR BINARY ACCESS WRITE AS #2                       ' Plaintext.
' ------------------------------------------------  '------------------------
CLS
PO& = 1                                  ' Initialize output file pointer.
CT% = 32                                 ' Block byte-count.
                                         '------------------------------------
DO WHILE (NOT EOF(1))
  T$ = INPUT$(CT%, #1)                   ' Get fixed-length records.
  IF T$ = " " THEN EXIT DO               ' Null-string?
  C% = 0                                 ' Clear output character accum.
  FOR PT% = 1 TO CT%                     ' Accumulate 32 sub-tallies.
    S$ = MID$(T$, PT%, 1)                ' Isolate single sub-tally.
    IF S$ = " " THEN EXIT FOR            ' Null-string?
    A% = ASC(S$)                         ' Convert byte to integer.
    FOR E% = 0 TO 7                      ' Sum eight bits.
      IF (A% MOD 2) THEN                 ' Is lo-order bit SET?
        C% = C% + 1                      ' Arithmetic-sum bits.
      END IF
      A% = A% \ 2                        ' Drop lo-order bit.
    NEXT E%                              ' Sum Eight bits.
  NEXT PT%                               ' Next sub-tally.
  Z$ = CHR$(C%)                          ' Convert one 1-byte Character.
  PUT #2, PO&, Z$                        ' Output one 1-byte Character.
  PO& = PO& + 1                          ' Increment output pointer.
  I& = I& + 32                           ' Increment input counter.
  O& = O& + 1                            ' Increment output counter.
LOOP                                     ' 'Til end-of-file.
' ------------------------------------------------  '------------------------
' ' Come here at End-of-file.
' ------------------------------------------------  '------------------------
PRINT "File-length_1 ="; LOF(1), "Bytes-in ="; I&
PRINT "File-length_2 ="; LOF(2), "Bytes-out ="; O&
CLOSE #1, #2
' ======================================================================+
SYSTEM
```

The present invention enhances current encryption methods by introducing a large measure of true randomness into what must ultimately be a deterministic process. The purpose is not to introduce a new encryption method, but to remove correlatable clues which limit the effectiveness of many existing Encryption Engines. The phrase "true randomness" needs further qualification. For these two algorithms, even pseudo-randomness is sufficient, for the values to have no usable correlation with the source plaintext.

Both of the encryption-enhancement algorithms described, create a blurring of the block boundaries. Each block represents a separate single byte or character of the source plaintext. Hence the blurring is actually a "random fusion" of the edges of the source bytes, and that fusion implies that the block edges overlap for one or more bits, thus obscuring source-character separation. It is not known how to equate this random-obscuring with any certain fixed level of traditional encryption key-width, such as (say) 256_bits_wide. It will vary from block-to-block, depending on chance mergings in the Data Compression phase of the enhancement process.

Academe, Government security agencies, and some independent researchers have adequate resources to exhaustively evaluate the efficacy of these algorithms. Crypt-Analysis is a black art, and those skilled in it are not likely to reveal to what degree that the state-of-the-art can recover plaintext from intractable ciphertext codes. It is still anticipated that the methods described in the present invention will prove valuable in expanding data security in a field already possessing many mature products.

One historical failing of good encryption methods can occur due to a human mistake of re-encrypting the same message with a previously used key. Some modern methods tend to minimize the likelihood of this happening by requiring the use of a Nonce, which is a word used only once and causes the resulting ciphertext to be different, even when the same encryption key is used. However, the introduction of Nonces can further complicate key administration. Anti-analysis encoding makes the need for Nonces largely unnecessary and avoids the associated additional complexity.

Figure 8:
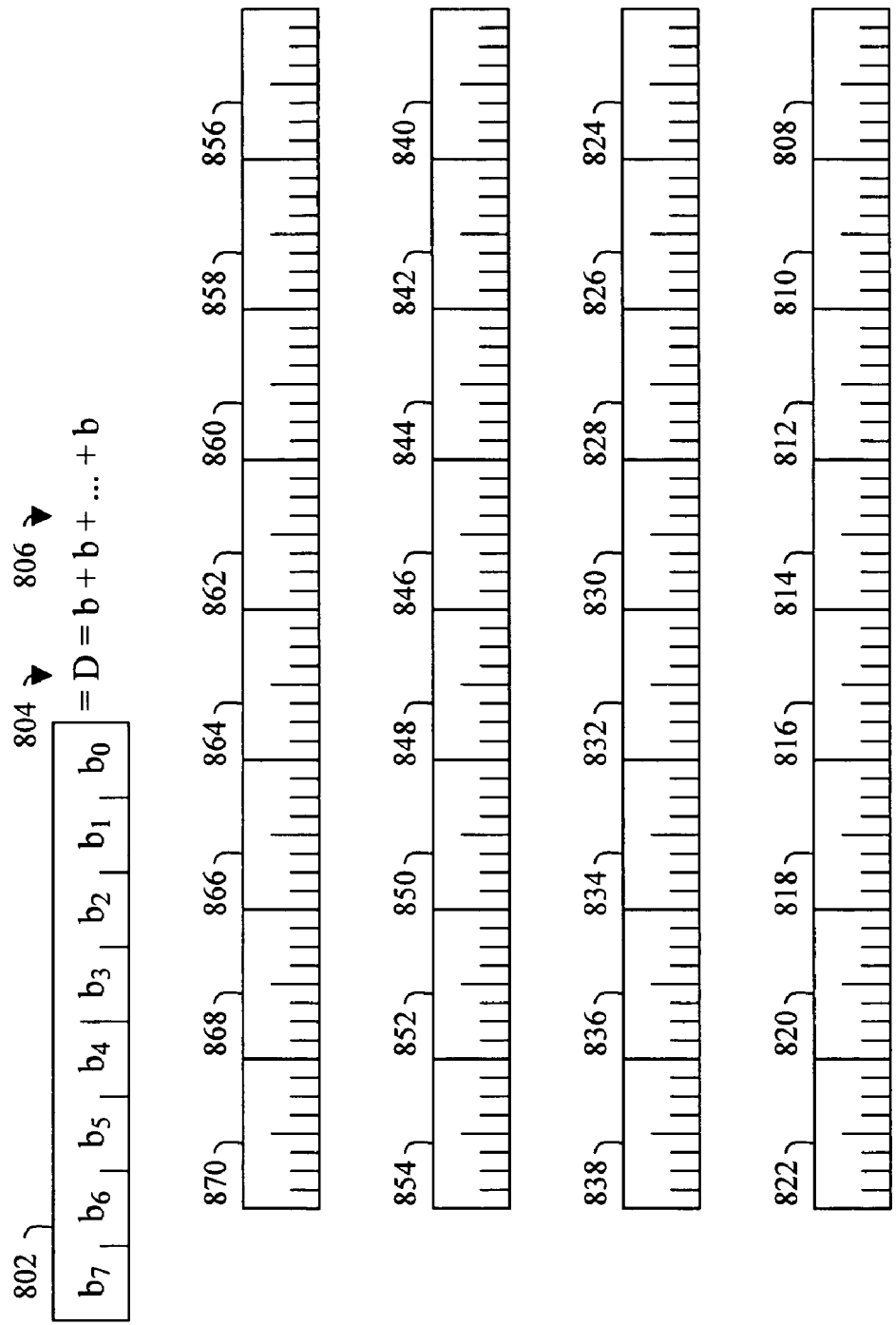
FIG. 8 shows a generic mapping of bits in a sample original data word to a group of generated data words according to an embodiment of the invention.

FIG. 8 shows a generic data word 802 that can be mapped to a decimal value D 804, for example, corresponding to a decimal value of the generic data word 802. The decimal value D 804 corresponds to a discrete number of data bits 806, the number of discrete data bits corresponding to the decimal value D 804. Each of the number of discrete data bits 806 is scattered among a collection of generated words (808 to 870) according to the CIPHER32 algorithm. In this case, this algorithm introduces data-redundancy by converting the decimal equivalent of an 8-bit plaintext character into a series of from one (1) to two-hundred fifty-five (255) bits, randomly distributed throughout a 32-byte block. That is, CIPHER32 converts the source ASCII plaintext file into Tally Language. The CIPHER32 algorithm may be implemented on a suitably programmed microcomputer.

Figure 9:
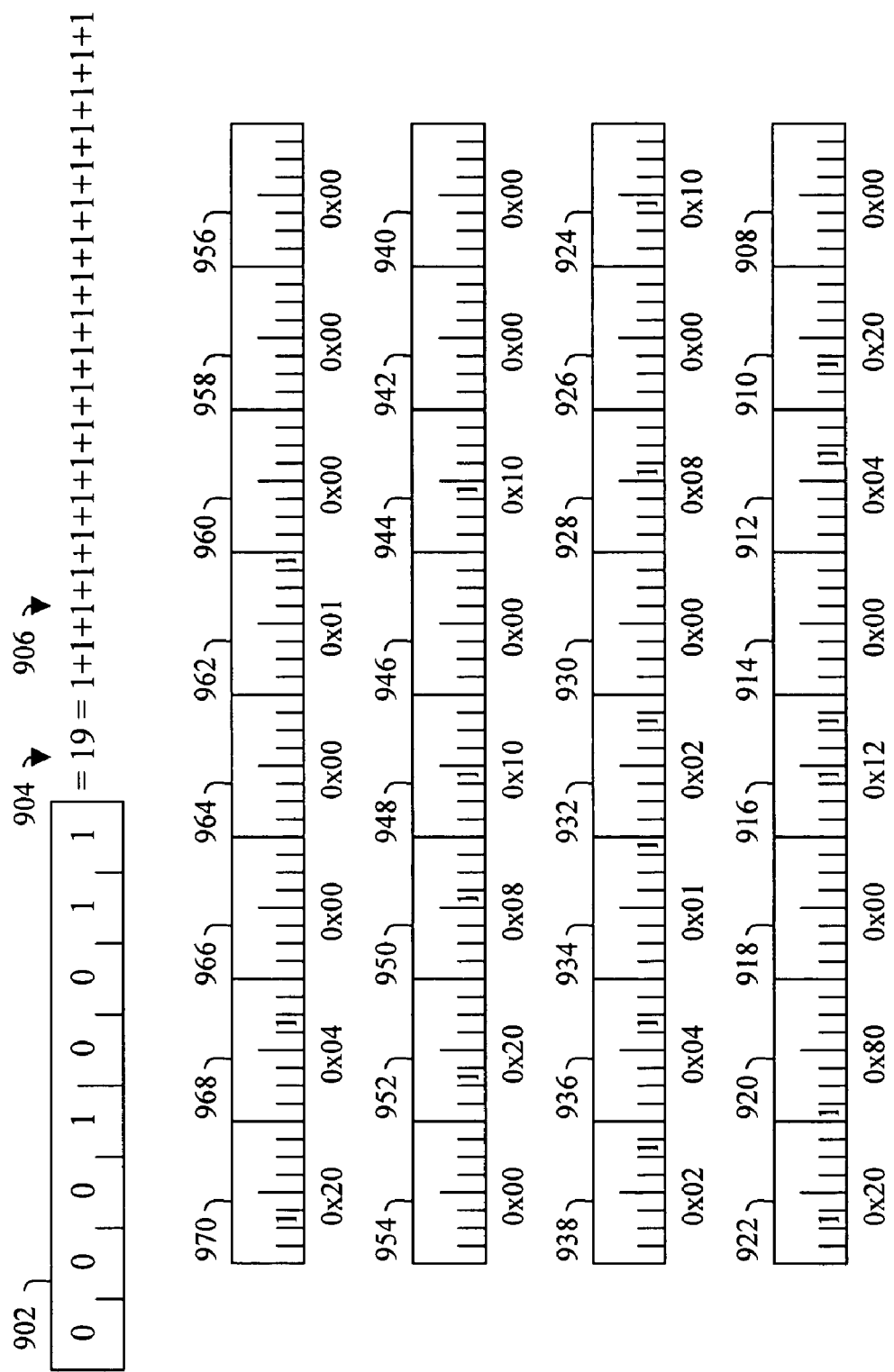
FIG. 9 shows a specific mapping of bits in a sample original data word to a group of generated data words according to an embodiment of the invention.
Figure 10:
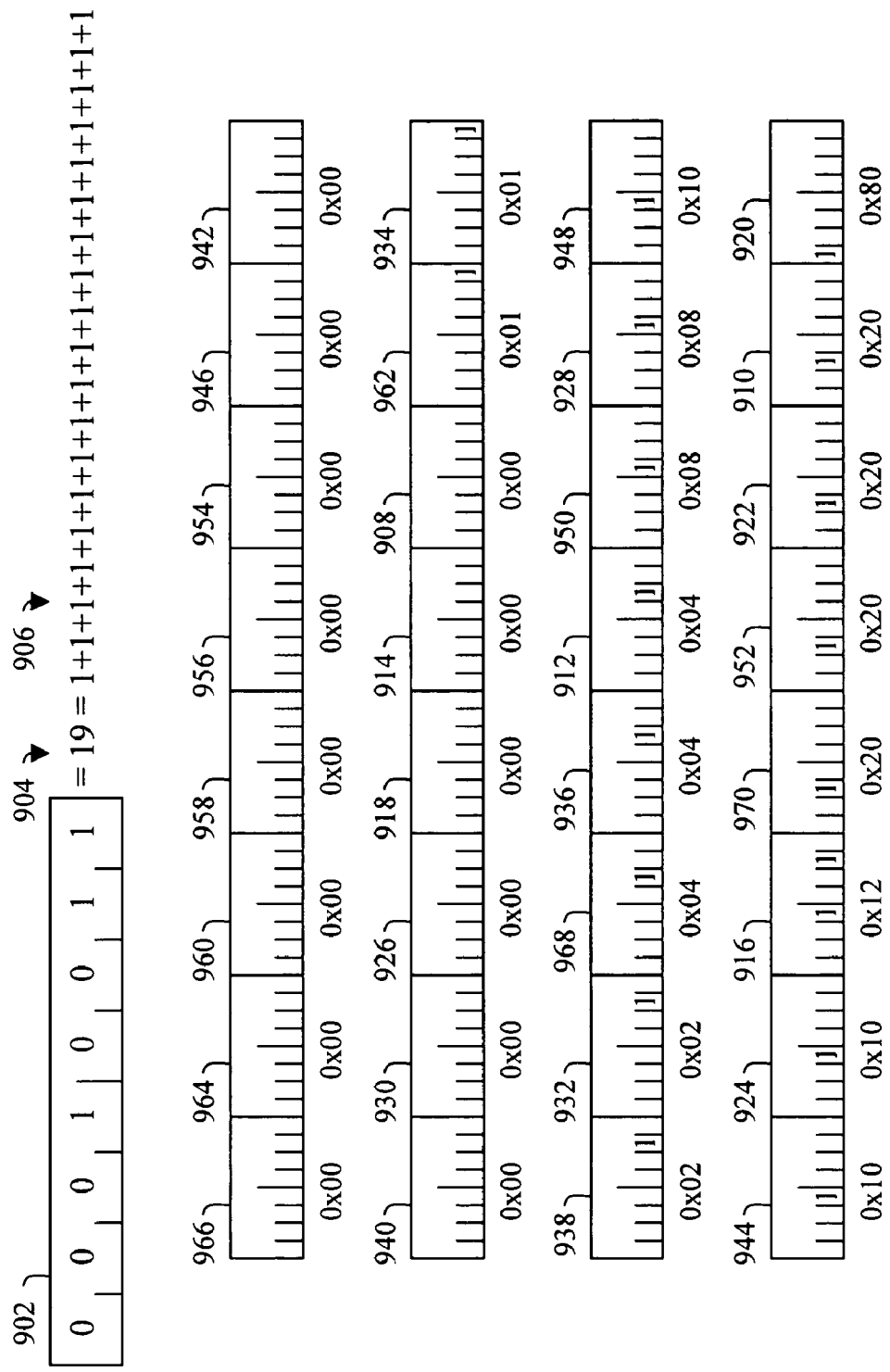
FIG. 10 shows a specific mapping of bits in a sample original data word to a group of generated data words where the generated data words are sorted and concatenated together according to an embodiment of the invention.

FIG. 9 shows an example of a data word 902 having a hexadecimal value of 0x13 and being converted into the decimal value 0d19 904 and being represented by nineteen "1" bits 906. In this case, the nineteen "1" bits are shown randomly scattered among the 32 data bytes for an 8-bit implementation as shown. Note, more than one bit may be set in a particular generated data word such as in generated data word 916. As before, the rest of the bits not shown as "1" are "0". FIG. 10 shows the generated data words (908 to 970) from FIG. 9 sorted according to a low-to-high sorting order. The choice for the sorting order of the very first group of new data words, whether ascending or descending, may be made randomly or by a default choice of either order. As an alternative, the choice of either an ascending or descending sorting order between subsequent word groups can also be made randomly. As in the case with NCIPH08, the NCIPH32 algorithm can be implemented using four choices regarding sorting of the new data words between subsequent word groups: ascending only, descending only, alternately ascending and descending, and randomly either ascending or descending.

Those skilled in the art will appreciate that various adaptations and modifications of the just-described preferred embodiments can be configured without departing from the scope and spirit of the invention. Therefore, it is to be understood that, within the scope of the amended claims, the invention may be practiced other than as specifically described herein.

What is claimed is:

1. An encoding method for a plaintext, comprising:
obtaining an original data word from a plurality of data words in an original plaintext, each original data word having a predetermined number of data bits occupying predetermined positions within the data word, each data bit being designated as one of a one or a zero;
generating a group of new data words using a processor consisting of a predetermined number of new data words equal to the number of data bits in the original data word, each new data word having the corresponding data bit from the original data word in the same position while the remaining bits are zero;
sorting the new data words in the group using a processor into one of an ascending and a descending order based on the binary value of the new data words in order to facilitate compression; and
outputting the group of new data words.

2. The encoding method of claim 1,
wherein the predetermined number of data bits in the original data word is one of 8, 16 or 32.

3. The encoding method of claim 1,
wherein the sorting order of the sequentially generated groups of new data words is one of ascending only, descending only, alternately ascending and descending, and randomly either ascending or descending.

4. The encoding method of claim 1,
wherein the initial sorting order of the first generated group of new data words is randomly chosen from one of an ascending and a descending order.

5. A decoding method for an encoded plaintext, comprising:
obtaining a group consisting of a plurality of data words, each of the plurality of data words having at most one bit set to the value one in mutually exclusive positions; and
outputting a single data word consisting of all the value one bits in their mutually exclusive positions while the remaining bits are set to value zero.

6. The decoding method of claim 5,
wherein the group of data words is sorted in one of an ascending and descending order.

7. An encoding method for a plaintext, comprising:
obtaining an original data word from a plurality of data words in an original plaintext, each original data word containing a predetermined number of data bits occupying predetermined positions within the data word, each data bit being designated as one of a one or a zero;
calculating the binary value of the original data word to determine a number of binary ones;
distributing the number of binary ones, using a processor, randomly among a group having a predetermined number of new data words, the predetermined number of new data words in the group being determined from the maximum possible number of data ones plus one and divided by the number of data bits in each data word;
sorting the new data words in the group using a processor into one of an ascending and a descending order based on the binary value the new data words in order to facilitate compression; and
outputting the group of new data words.

8. The encoding method of claim 7,
wherein the predetermined number of data bits in the original data word is one of 8, 16 or 32.

9. The encoding method of claim 7,
wherein the initial sorting order of the first generated group of new data words is randomly chosen from one of an ascending and a descending order.

10. The encoding method of claim 7,
wherein the sorting order of the sequentially generated groups of new data words is one of ascending only, descending only, alternately ascending and descending, and randomly either ascending or descending.

11. The encoding method of claim 10,
wherein the boundaries between sequentially generated groups are blurred rendering the blocking-structure indistinct.

12. The encoding method of claim 8,
wherein the predetermined number of data bits in the original data word is 8, and
wherein the predetermined number of new data words in the group is 32.

13. The encoding method of claim 8,
wherein the predetermined number of data bits in the original data word is 16, and
wherein the predetermined number of new data words in the group is 4096.

14. A decoding method for an encoded plaintext encoded by the method of claim 7, comprising:
obtaining a group containing a plurality of data words;
summing the number of ones in each of the plurality of data words in the group to produce a one sum value;
outputting a single data word having the one sum value represented as a binary value.

15. The decoding method of claim 14,
wherein the plurality of data words in the group are sorted in one of an ascending and descending order.

* * * * *